(12) United States Patent
Klancnik

(10) Patent No.: US 8,745,795 B2
(45) Date of Patent: Jun. 10, 2014

(54) BEDDING COMPONENT WITH FIRE-RESISTANT LAMINATE

(75) Inventor: Steve Klancnik, Lake Barrington, IL (US)

(73) Assignee: Serta, Inc., Hoffman Estates, IL (US)

( * ) Notice: Subject to any disclaimer, the term of this patent is extended or adjusted under 35 U.S.C. 154(b) by 109 days.

(21) Appl. No.: 13/346,301

(22) Filed: Jan. 9, 2012

(65) Prior Publication Data

US 2013/0174346 A1  Jul. 11, 2013

(51) Int. Cl.
*A47C 27/00* (2006.01)

(52) U.S. Cl.
USPC ................................................ 5/698; 5/483

(58) Field of Classification Search
USPC ............................................ 5/483, 484, 698
See application file for complete search history.

(56) References Cited

U.S. PATENT DOCUMENTS

| | | | |
|---|---|---|---|
| 2,610,338 A | 9/1952 | Taylor | |
| 3,512,192 A | 5/1970 | Simon | |
| 3,818,520 A | 6/1974 | Richards | |
| 3,833,951 A | 9/1974 | Hurwitz | |
| 4,092,752 A | 6/1978 | Dougan | |
| 4,504,990 A * | 3/1985 | Scales et al. | 5/698 |
| 4,504,991 A | 3/1985 | Klancnik | |
| 5,578,368 A | 11/1996 | Forsten et al. | |
| 6,609,261 B1 | 8/2003 | Mortensen et al. | |
| 6,718,583 B1 | 4/2004 | Diaz | |
| 6,823,548 B2 * | 11/2004 | Murphy et al. | 5/698 |
| 6,954,956 B1 | 10/2005 | Diaz | |
| 7,424,762 B2 | 9/2008 | Wright et al. | |
| 7,484,256 B2 * | 2/2009 | Murphy et al. | 5/698 |
| 7,827,637 B2 | 11/2010 | DeFranks | |
| 8,181,293 B2 | 5/2012 | DeFranks et al. | |
| 8,414,732 B2 | 4/2013 | DeFranks | |
| 2006/0021148 A1 * | 2/2006 | Weller, Jr. | 5/698 |
| 2006/0048301 A1 | 3/2006 | Klancnik et al. | |
| 2007/0226911 A1 | 10/2007 | Gladney et al. | |
| 2008/0263774 A1 * | 10/2008 | Lee | 5/691 |
| 2009/0144907 A1 * | 6/2009 | Gladney et al. | 5/698 |
| 2011/0256380 A1 | 10/2011 | Chandler et al. | |
| 2012/0180225 A1 | 7/2012 | Gladney et al. | |

FOREIGN PATENT DOCUMENTS

| | | |
|---|---|---|
| GB | 2067896 A | 8/1981 |
| GB | 2157163 A | 10/1985 |
| WO | 2006028801 A3 | 3/2006 |

OTHER PUBLICATIONS

International Search Report & Written Opinion dated Oct. 4, 2006 (International Patent Application No. PCT/US05/30807).
International Preliminary Report on Patentability completed on Oct. 1, 2007 (International Patent Application No. PCT/US05/30807).

* cited by examiner

*Primary Examiner* — Michael Trettel
(74) *Attorney, Agent, or Firm* — Quarles & Brady LLP

(57) ABSTRACT

Components, such as bedding components including mattresses are disclosed herein. The components include a first layer, a fire-resistant layer affixed to the first layer or an optional additional layer, and a fire-resistant sock. The first layer, the optional additional layer, and fire-resistant layer are disposed within the fire-resistant sock.

13 Claims, 1 Drawing Sheet

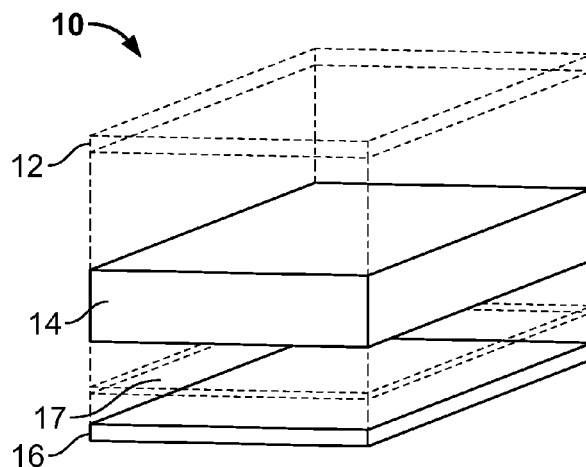
FIG. 1
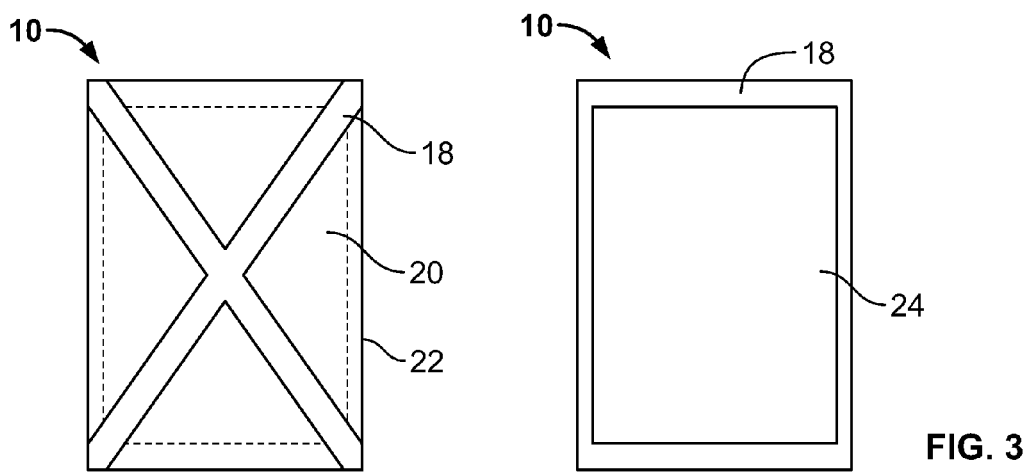
FIG. 2
FIG. 3
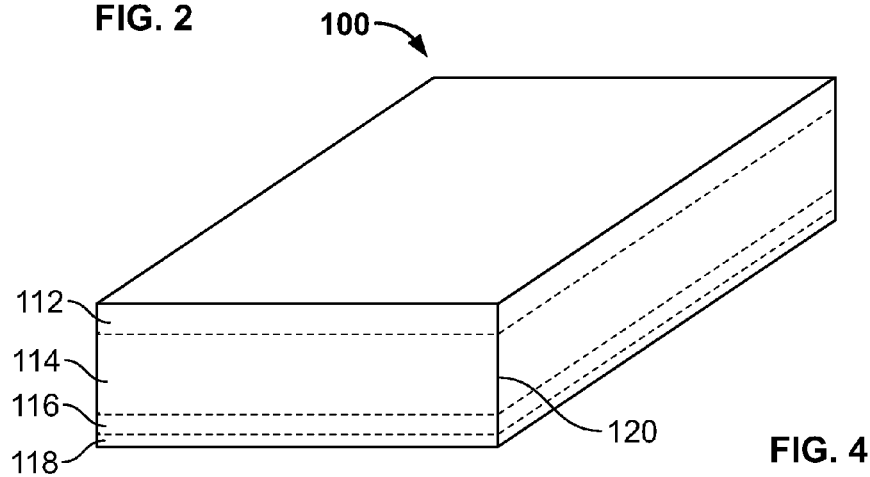
FIG. 4

BEDDING COMPONENT WITH FIRE-RESISTANT LAMINATE

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

Components, such as mattresses and the like, with a fire-resistant laminate are disclosed herein.

2. Description of the Background of the Invention

For decades mattress manufacturers have been concerned with mattress fires. Tens of thousands of bedroom fires have been attributed to cigarette ignition of mattresses resulting from people smoking in bed. Tens of thousands of additional fires may be attributed to open flame ignition of mattresses. Given the large number of fires, Federal standards were introduced in an attempt to limit the spread of fires that originated on a mattress.

Studies conducted to improve the understanding of mattress fires led to the development of a test apparatus that could accurately and consistently simulate a burning bedclothes ignition source. The tests involved placing a mattress/foundation on top of a steel twin-sized bed frame which, in turn, rested on a cement fiberboard surface that formed the bottom of a catch pan. A pair of gas burners was designed to mimic the thermal impact of burning bedclothes. One burner was placed to direct a flame onto a surface top of a mattress surface while the second was placed to direct a flame onto a mattress side. The flame generated by the side burner was allowed to burn for 50 seconds while the flame from the top burner burned for 70 seconds. The fires generated by these burners were monitored and it was observed that a typical mattress reached the flashover point in approximately three minutes. Flashover is the point at which the entire contents of a room are ignited simultaneously by radiant heat, making conditions in the room untenable and safe exit from the room impossible. At flashover, room temperatures typically exceed 600-800° C. (approximately 1100-1470° F.). About two-thirds of all mattress fatalities are attributed to mattress fires that lead to flashover. This accounts for nearly all of the fatalities that occur outside the room where the fire originated and about half of the fatalities that occur within the room of origin.

As a result of these studies, at least one State enacted a regulation (Technical Bulletin 603) that required that a fire on a mattress could not exceed 25 mega joules of heat in the first 15 minutes of the fire, or a peak rate of heat release of 200 kW over a 30-minute period. A Federal regulation by the Consumer Product Safety Commission superseded the State regulation (see 16 CFR Part 1633—Standard for Flammability (Open Flame) of Mattress Sets; Final Rule, dated Mar. 15, 2006). The Federal regulation requires mattresses to not exceed either of a) a total heat release of 15 mega joules in the first 10 minutes of the test or b) a maximum heat release rate of 200 kW during the first 30 min. Further, regardless of State and Federal mattress burn standards, manufacturers of mattresses continue to develop technology to better minimize heat release during mattress fires to provide for greater consumer safety.

By reducing the size and growth rate of a fire, it is possible to reduce bed fire casualties by one-half to two-thirds. This is because extra time to escape the residence is provided. Furthermore, additional time is also provided for a person on the mattress to escape with only isolated burns, if any.

In practice, mattress manufacturers follow either or both of two approaches to fire risk reduction: (a) reduce the likelihood of sustained ignition and (b) mitigate the consequences of an ignition. To help achieve these goals, typical fire-resistant mattresses have a fire-resistant barrier located near the outer layer of the mattress, with the outer layer being made of a quilt or ticking material. A more effective approach is to manufacture mattresses that incorporate fire-resistant compartments formed by encapsulating flammable materials within layers of fire-resistant material. However, newer approaches to fire risk reduction are needed that minimize the costs of mattress manufacture while maintaining or improving fire resistance and aesthetics in mattresses.

SUMMARY OF THE INVENTION

According to one aspect of the present disclosure, a component includes a first layer, a fire-resistant layer affixed to the first layer or an optional additional layer, and a fire-resistant sock. The first layer, the optional additional layer, and fire-resistant layer are disposed within the fire-resistant sock.

According to another aspect of the present disclosure, a bedding component includes a monolithic foam core and a fire-resistant fabric layer affixed to a bottom surface of the monolithic foam core with an adhesive. The fire-resistant layer provides additional rigidity to the edges of the monolithic foam core.

According to a further aspect of the present disclosure, a mattress includes a foam layer, a fire-resistant layer adhered to a bottom surface of the foam layer with an adhesive applied to a peripheral edge of the bottom surface of the foam layer, and a fire-resistant sock. The fire-resistant sock creates a char barrier that extends around the mattress to retard combustion of the mattress on all sides when contacted with an open flame.

BRIEF DESCRIPTION OF THE DRAWINGS

FIG. 1 is an exploded isometric view of a component according to one embodiment;

FIG. 2 is a top plan view of an adhesive application pattern that may be used in the affixation of layers within the components according to one embodiment;

FIG. 3 is a top plan view of an adhesive application pattern that may be used in the affixation of layers within the components according to a further embodiment; and FIG. 4 is an isometric view of a component according to one embodiment enclosed within a fire-resistant sock.

DETAILED DESCRIPTION

The present disclosure relates to components, including mattresses, cushions, pillows, mattress supports, such as box springs, pads, mats, and the like. The present disclosure further relates to the incorporation of materials into components that consistently improve the fire-resistance of the component. More specifically, the present disclosure is directed to components that include a fire-resistant laminate affixed to a bottom surface of a core layer of the components, which simplifies efforts to render such components fire-resistant.

Contemplated components may be part of a conventional item of furniture, such as a bed equipped with a bed frame. In this scenario, the component may be a mattress that is placed upon the bed frame, perhaps atop of a box spring or other mattress support. As an alternative, the component may form an integral part of an item of furniture. For example, the component may be in the form of a padded sleeping surface of a foldable cot, wherein the sleeping surface incorporates one or more structural components of a support frame of the cot. In this way, the sleeping surface is affixed to the support frame of the cot. In other examples, the component may be a cushion of a chair or a couch, a throw pillow, a pet pillow, a portion of a car seat, or any other padded surface.

Components that may be rendered fire-resistant may be of any desired size according to the intended use. In the context of mattresses, a mattress may have a length of about 73 to about 82 inches and a width of about 37 to about 75 inches. However, a mattress may be shorter or longer. Indeed, many mattresses may be manufactured to conform to standard size conventions, such as, a crib mattress size, a twin bed size, a twin XL size, a full bed size, a full XL size, a queen bed size, a king bed size, and a California king size.

In one embodiment depicted in FIG. 1, a contemplated component comprises a bedding component 10 that includes an optional top portion 12, a middle portion 14, a bottom portion 16, and an optional intermediate portion 17 disposed between the middle and bottom portion. The top portion 12 and intermediate portion 17 may each be comprised of x+m layers, wherein x=0, and m=0-infinity, and wherein each of x+m layers is affixed to any adjacent layer on a top surface and/or a bottom surface thereof. For example, top portion 12 or intermediate portion 17 may include 0 layers, or 1-6 layers, or 2-8 layers, or 3-12 layers, or 4-20 layers. The middle portion 14 and bottom portion 16 may each be comprised of x+n layers, wherein x=0, and n=1-infinity, and wherein each of x+n layers is affixed to any adjacent layer on a top surface and/or a bottom surface thereof. For example, middle portion 14 or bottom portion 16 may include 1-6 layers, or 2-8 layers, or 3-12 layers, or 4-20 layers. However, the sum of all the layers of the bedding component is greater than or equal to 2, i.e., $2(x+m)+2(x+n) \geq 2$, and more preferably the sum of all layers is between 2 and 20. The layers disclosed herein may be arranged, for example, stacked, in any order relative to one another.

Layers of the present disclosure may be affixed to one another by means known in the art. For example, the layers of FIG. 1 may be adhered together with an adhesive or other suitable means. When an adhesive is used, top portion 12 layers and middle portion 14 layers may be adhered together by applying an adhesive in a pattern as shown in FIG. 2, where the adhesive 18 forms an "X" pattern on the bottom surface 20 of, for example, a top portion 12 layer. In another embodiment, an additional peripheral pattern of adhesive 22 may be added to the "X" pattern to provide a greater bond between layers. It is further contemplated that any of a top or bottom surface of layers from any of the top, middle, intermediate, or bottom portions may be affixed in this manner.

An alternate adhesive application pattern may be used to adhere a fire-resistant layer directly to a bottom surface of the middle portion 14, such as a foam core, or intermediate portion 17, of the component. As seen in FIG. 3, the adhesive 18 is applied to an entire periphery of a bottom surface 24 of the portion. In this way, the fire-resistant layer is ensured to completely cover the bottom surface 24 of the foam core.

Component layers may be of any thickness. For example, in several preferred embodiments, the component layer is less than or about ½ inch, less than or about 1 inch, less than or about 2 inches, less than or about 3 inches, less than or about 4 inches, less than or about 5 inches, less than or about 6 inches, less than or about 8 inches, or less than or about 12 inches, and all thicknesses in between. Component layers may also be of varying widths and lengths that are not necessarily tied to the size of the component. For example, a mattress may include a first layer with a first width and a second layer with a second width, where the first width is wider or narrower than the second width. When a layer is wider than the bedding component, it may be folded in upon itself or folded upwardly or downwardly along the side of the bedding component to form a portion of a sidewall of the bedding component. Similar variability with respect to layer length is also possible.

Layers may be sprayed-on, injection molded, extruded, coextruded, laminated, and the like. Layers may be affixed by any suitable means known in the art. For example, layers may be stapled, tacked, welded, laminated, mechanically affixed via friction or interference fit, adhered via an adhesive, a glue, a cement, or other material with adhesive properties, stitched, affixed via hook and loop fastener, a zipper, a Dennison-style tag, snaps, and/or other reversible means.

Layers may include a fabric, a natural fiber, a synthetic fiber, a ticking layer, a quilt layer, a thread layer, a film, a foam, a gel, a gel foam, a woven layer, a nonwoven layer, a fire-resistant layer, a non-skid layer, and combinations thereof. A component core layer may be any mattress core construction including a foam core, a gel foam core, latex core, an inner spring layer, or a layer of individually wrapped coils. For example, fire-resistant layers contemplated for use herein include PFG880 Precision Fabrics Group (Greensborough, N.C.) and Tietex C243 (Tietex International, Ltd., Spartanburg, S.C.). Additional fire resistant fabrics are known in the art and may include fire-resistant materials comprising fire-resistant polyesters and/or fire-resistant rayon, and the like. Further, additional materials that may be used in the construction of the components contemplated herein include those disclosed in Ser. No. 13/346,384, entitled "Method for Providing a Fire-resistant Component," and Ser. No. 13/346,429, entitled "Component With Multiple Layers," each filed on the same date as the present disclosure.

In another embodiment, a layer may further include an adhesive, such as a hot melt, water-based or pressure sensitive adhesive. Adhesives that may be used in the present disclosure include any adherent materials or fasteners known in the art. Specific examples of adhesives include hot melt, water-based, and pressure-sensitive adhesives, fire-resistant adhesives, and mixtures thereof. Hot melt adhesives that may be used include those available from Henkel (Rocky Hill, Conn.) and UPACO adhesives available from Worthen Industries (Nashua, N.H.). Water-based adhesives that may be used include water-based adhesives under the SIMALFA brand available from Alfa Adhesives, Inc. (Hawthorne, N.J.). Further, a layer may further include a silica, a metallic layer, a plastic, such as an acrylic, a modacrylic, a polyolefin, a latex, a polyurethane, and combinations and/or blends thereof. In addition, a layer may further include biocides, preservatives, odor blocking agents, scents, pigments, dyes, stain guards, antistatic agents, antisoiling agents, water-proofing agents, moisture wicking agents, and the like, as are known in the art.

One particular material contemplated herein is foam, such as a polyurethane or latex-containing foam. Foams contemplated herein may vary by density, firmness, as may be measured by indentation force deflection (IFD) or other suitable metrics, and thickness, among other characteristics. One example of a foam that may be used is KOOLCOMFORT foam. Additional foams contemplated are available from Advanced Urethane Technologies (West Chicago, Ill.). The characteristics of a foam layer may be chosen based on whether the layer is to be placed within the top portion 12, the middle portion 14, the bottom portion 16, or the intermediate portion 17 of the bedding component (see FIG. 1). A foam to be used in the top portion 12 of a bedding component, such as a mattress, may be less firm to provide a more comfortable feel than a foam used in the middle portion 14, which provides a relatively more rigid support for the top portion. Foams may have a density of about 1 to about 5 lbs/ft$^3$, or about 2 to about 4 lbs/ft$^3$. With respect to firmness, contemplated foams used herein may have an IFD of between about 1 to about 100 lbs, or about 2 to about 60 lbs, or about 6 to about 36 lbs, or about 12 to about 52 lbs, or about 20 to about 80 lbs. Foam layers may be monolithic or formed from multiple pieces of a single foam material or of different foam materials affixed to one another, as described herein.

A further layer contemplated includes a fire-resistant material that is laminated to a bottom surface of the component. Typically, the fire-resistant laminate is adhered to a bottom surface of a foam layer. In the context of a mattress, the fire-resistant layer may be a non-skid material, which helps prevent the mattress from sliding when placed on top of a mattress support, such as a box spring. One example of a non-skid material is a velour, though additional materials are contemplated. Fire-resistant materials useful as laminates include fabrics, spun-bonded materials, stitch-bonded materials, woven materials, nonwoven materials, films, and other flexible and/or stretchable materials that are made of inherently fire-resistant threads or that have been treated with or constructed to include a fire-resistant material or both. In one particular embodiment, the fire-resistant material may include PFG880 and PFG 6009-5006 barrier filler cloth, which has a basis weight of about 4.5 to about 6.1 oz/yd$^2$, available from Precision Fabrics Group (Greensborough, N.C.), and Tietex C243, which has a basis weight of about 5.0 oz/yd$^2$ and is available from Tietex International, Ltd. (Spartanburg, S.C.).

The fire-resistant layer provides additional rigidity to the edges and corners of the bottom surface of a foam layer, which enables the component to be better tailored within a fabric cover when the fire-resistant laminate is at the bottom surface of the component. In addition, the fire-resistant layer adds to the durability of the bottom surface of the component against normal wear and tear. Components constructed with a fire-resistant laminate bottom layer may be used in the assembly of bedding components, such as mattresses, and thereby enable the production of mattresses with improved fire-resistance compared to conventional mattresses.

Components of the present disclosure may be rendered fire-resistant by being enclosed within a fire-resistant layer or "sock" that completely surrounds the component. Fire-resistant socks include materials, such as fabrics, spun-bonded materials, stitch-bonded materials, woven materials, non-woven materials, films, and other flexible and/or stretchable materials that are inherently fire-resistant or that have been treated with a fire-resistant material or both. The fire-resistant sock may be formed with a seam along at least one end, such as in a tube, to form an enclosure with an opening into which a component may be inserted. Alternatively, fire-resistant socks may be seamless. One fire-resistant sock material that may be used is Springs Creative fire-resistant sock available from Springs Creative (Rock Hill, S.C.), which is made of about 61% modacrylic and about 39% silica (fiberglass), has a density of about 7.0 oz/yd$^2$, and a thickness of about 0.02 inches. While the fire-resistant laminates of the present disclosure may be rigid materials, fire-resistant socks are typically "transparent" to the feel of the component. Therefore, in the context of a mattress, the fire-resistant sock is not readily noticeable by an individual resting thereon.

Another embodiment of the present disclosure is depicted in FIG. 4. Here, a component 100 includes a top portion 112, a middle portion 114, a bottom portion 116, and a fire-resistant laminate 118 all sealed within a fire-resistant sock 120. Suitable methods for sealing the sock are disclosed in Ser. No. 13/346,384, entitled "Method for Providing a Fire-resistant Component" and filed on the same date as the present disclosure.

It has been found that the combination of the fire-resistant laminate and the fire-resistant sock provide advantages over conventionally made components, such as mattresses. The fire-resistant laminate and fire-resistant sock provide both a greater char barrier at the bottom of the mattress and a continuous char barrier that extends around the component and retards combustion of the component from all sides. The char barrier inhibits the flow out of the sock of gases and molten materials, such as polyurethane, that result from heat exposure of the component during a fire. As a result, the combination of the fire-resistant laminate and the fire-resistant sock slows or stops flammable materials of the component from contributing to a fire to improve fire safety of components, such as mattresses.

EXAMPLES

To determine the fire-resistant properties attributable to the addition of the fire-resistant layer affixed to a bottom layer of a component, a flammability test was performed on a representative mattress prototype. The prototype included from top down: 1) an outer upholstery layer of cotton/polyester; 2) a polyurethane foam layer; 3) a KOOLCOMFORT gel topper layer; 4) a synthetic latex/polyurethane foam layer; 5) a second KOOLCOMFORT gel topper layer; 6) a 6" thick polyurethane foam core; and 7) a PFG-880 fire-resistant laminate. The prototype was sealed within a Springs Creative fire-resistant sock. The prototype was tested on a standard wood pine frame foundation, with polyester/polypropylene ticking, pillow fill, a bottom non-skid polyester layer, a non-fire-resistant pad, and polypropylene dust over. The test was carried out in compliance with 16 CFR Part 1633—Standard for Flammability (Open Flame) of Mattress Sets. The test was performed once for three identical mattress sets (samples A, B and C). Results for the test are below in Table No. 1.

TABLE 1

Results for Flame Test

| Test No. | Sample ID | Peak Heat Release Rate, During first 30 minutes (kW) | Time to Peak Heat Release Rate (min) | Total Heat Release at 10 min (MJ) |
|---|---|---|---|---|
| 1 | A | 37 | 0.5 | 3.2 |
| 2 | B | 37 | 0.4 | 2.0 |
| 3 | C | 38 | 0.6 | 5.3 |
| Average | — | 37.33 | 0.5 | 3.5 |

INDUSTRIAL APPLICATION

The bedding components with a fire-resistant laminate and a fire-resistant sock disclosed herein provide consumers with greater protection from fire. The disclosure has been presented in an illustrative manner in order to enable a person of ordinary skill in the art to make and use the disclosure, and the terminology used is intended to be in the nature of description rather than of limitation. It is understood that the disclosure may be practiced in ways other than as specifically disclosed, and that all modifications, equivalents, and variations of the present disclosure, which are possible in light of the above teachings and ascertainable to a person of ordinary skill in the art, are specifically included within the scope of the claims. All patents and patent applications disclosed herein are incorporated by reference herein, in their entireties.

What is claimed is:

1. A component, comprising:
   a first layer;
   a fire-resistant layer affixed to the first layer; and
   a fire-resistant sock,
   wherein the first layer and the fire-resistant layer are disposed within the fire-resistant sock, and
   wherein the fire-resistant layer comprises a non-skid material that provides additional rigidity to the edges of the first layer.

2. The component of claim 1, wherein the first layer comprises a fabric, a natural fiber, a synthetic fiber, a ticking layer, a quilt layer, a thread layer, a film, a foam, a gel, a gel foam, a spun-bonded material, a stitch-bonded material, a woven layer, a nonwoven layer, a fire-resistant layer, a non-skid layer, and combinations thereof.

3. The component of claim 2, wherein the first layer comprises a foam.

4. The component of claim 3, wherein the foam has a density of about 1 to about 5 lbs/ft$^3$.

5. The component of claim 3, wherein the foam has an IFD of between about 1 to about 100 lbs.

6. The component of claim 1, wherein the fire-resistant layer is affixed to a bottom surface of the first layer.

7. The component of claim 6, wherein the fire-resistant layer is affixed to the first layer with an adhesive applied to a peripheral edge of the bottom surface of the first layer.

8. The component of claim 6, wherein the fire-resistant layer is selected from the group consisting of PFG880, PFG 6009-5006, and Tietex C243.

9. The component of claim 1 further comprising an additional layer, wherein the additional layer comprises an intermediate layer disposed between the first layer and the fire-resistant layer.

10. The component of claim 1, further comprising a second additional layer affixed to a top surface of the first layer.

11. The component of claim 1, wherein the component comprises a mattress, a cushion, a pillow, a pad, or a mat.

12. The component of claim 11, wherein the component comprises a mattress.

13. The component of claim 12, wherein the mattress has a size selected from the group consisting of a crib mattress size, a twin bed size, a twin XL size, a full bed size, a full XL size, a queen bed size, a king bed size, and a California king size.

* * * * *